US012424430B2

(12) United States Patent
Chu et al.

(10) Patent No.: US 12,424,430 B2
(45) Date of Patent: Sep. 23, 2025

(54) ION STORAGE SYSTEM AND METHOD BASED ON QUADRUPOLE-ION TRAP TANDEM MASS SPECTROMETRY

(71) Applicant: National Institute of Metrology, China, Beijing (CN)

(72) Inventors: Shiying Chu, Beijing (CN); You Jiang, Beijing (CN); Xiang Fang, Beijing (CN); Zejian Huang, Beijing (CN); Xinhua Dai, Beijing (CN); Yuting An, Beijing (CN); Di Zhang, Beijing (CN)

(73) Assignee: NATIONAL INSTITUTE OF METROLOGY, CHINA, Beijing (CN)

( * ) Notice: Subject to any disclaimer, the term of this patent is extended or adjusted under 35 U.S.C. 154(b) by 366 days.

(21) Appl. No.: 18/071,190

(22) Filed: Nov. 29, 2022

(65) Prior Publication Data

US 2023/0094398 A1 Mar. 30, 2023

Related U.S. Application Data

(63) Continuation of application No. PCT/CN2021/080045, filed on Mar. 10, 2021.

(30) Foreign Application Priority Data

Jul. 8, 2020 (CN) ........................ 202010651850.3

(51) Int. Cl.
*H01J 49/42* (2006.01)
*H01J 49/06* (2006.01)

(52) U.S. Cl.
CPC ........ *H01J 49/4295* (2013.01); *H01J 49/063* (2013.01); *H01J 49/4225* (2013.01)

(58) Field of Classification Search
CPC ...... H01J 49/063; H01J 49/067; H01J 49/004; H01J 49/4225; H01J 49/4265; H01J 49/4295
See application file for complete search history.

(56) References Cited

U.S. PATENT DOCUMENTS

| | | | |
|---|---|---|---|
| 5,179,278 | A | 1/1993 | Douglas |
| 5,811,800 | A | 9/1998 | Franzen et al. |

(Continued)

FOREIGN PATENT DOCUMENTS

| | | | |
|---|---|---|---|
| CN | 105655224 | A | 6/2016 |
| CN | 110610847 | A | 12/2019 |
| CN | 111933512 | A | 11/2020 |

OTHER PUBLICATIONS

Chu, Shiying, “Research on Collision-induced Dissociation Technology within Quadrupole-Linear Ion Trap Mass Spectrometry”, Chinese Excellent Master’s Thesis Full Text Database (Series I of Engineering Science and Technology) (Science-Engineering (A), China Master’s Theses Full-Text Database), Nov. 15, 2019.

*Primary Examiner* — David E Smith
(74) *Attorney, Agent, or Firm* — NKL Law; Allen Xue

(57) ABSTRACT

The present invention relates to the technical field of mass spectra. Disclosed are a novel ion storage system and method based on a quadrupole-ion trap tandem mass spectrometry. The system sequentially comprises a heating capillary, a tube lens, a skimmer, a first ion guide, a second ion guide, a quadrupole mass analyzer, an ion trap mass analyzer, and a detector; a first lens is provided between the first ion guide and the second ion guide; a second lens and a third lens are provided between the second ion guide and the quadrupole mass analyzer, wherein operation modes of the first ion guide and the second ion guide comprise an ion transmission mode and an ion storage mode. Compared with conventional time sequence control methods, more ions are stored during the same time according to the present invention, thereby improving the sensitivity of the instrument.

6 Claims, 6 Drawing Sheets

(56) References Cited

U.S. PATENT DOCUMENTS

| | | | | |
|---|---|---|---|---|
| 6,528,784 | B1 * | 3/2003 | Tang | H01J 49/067<br>250/282 |
| 8,384,022 | B1 * | 2/2013 | Remes | H01J 49/0009<br>250/252.1 |
| 8,822,916 | B2 * | 9/2014 | Guna | H01J 49/26<br>250/281 |

* cited by examiner

ION STORAGE SYSTEM AND METHOD BASED ON QUADRUPOLE-ION TRAP TANDEM MASS SPECTROMETRY

CROSS REFERENCE TO RELATED APPLICATIONS

This application is based upon and claims the benefit of priority from the prior Chinese Patent Application No. 202010651850.3, filed on Jul. 8, 2020, and International Patent Application No. PCT/CN2021/080045, filed on Mar. 10, 2021, the entire contents of all of which are hereby incorporated by reference.

FIELD

The present disclosure relates to the technical field of mass spectra, and in particular to a novel ion storage system and method based on a quadrupole-ion trap tandem mass spectrometry.

BACKGROUND

A quadrupole ion trap mass spectrometer has the advantages of full scan, high sensitivity, high-resolution scan and $MS^n$, and thus is widely used in the field of analytical chemistry.

Voltages for a quadrupole mass analyzer and an ion trap mass analyzer are applied in the same manner: same voltages are applied to opposite electrodes, and opposite voltages are applied to adjacent electrodes. For the ion trap mass analyzer, certain radio frequency voltage and direct current voltage are applied to form a quadrupole field for trapping ions. However, the structural dimension of the ion trap itself limits its ion storage capacity. When too many ions are injected, a space charge effect occurs in the ion trap, leading to problems such as a mass shift and analysis result distortion.

In addition, ion storage cannot be performed when the ion trap is in an ion analysis state. If an ion source produces a great number of ions, the time required to fill the ion trap may be much shorter than the time required for the ion trap to perform analysis. During the analysis, the ions produced by the ion source are wasted, resulting in a very low duty cycle of the ion trap and a decrease in sensitivity of the system.

SUMMARY

Based on the above problems, the present disclosure for patent provides a novel ion storage system and method based on a quadrupole-ion trap tandem mass spectrometry.

According to a first aspect of the present disclosure, a novel ion storage system based on a quadrupole-ion trap tandem mass spectrometry is provided.

The ion storage system sequentially comprises a heating capillary, a tube lens, a skimmer, a first ion guide, a second ion guide, a quadrupole mass analyzer, an ion trap mass analyzer, and a detector, a first lens being provided between the first ion guide and the second ion guide, and a second lens and a third lens being provided between the second ion guide and the quadrupole mass analyzer, wherein operation modes of the first ion guide and the second ion guide comprise an ion transmission mode and an ion storage mode.

Further, when the voltage of the second lens is set to +10 V, the first ion guide and the second ion guide operate in the ion storage mode; and when the voltage of the second lens is set to −20 V, the first ion guide and the second ion guide operate in the ion transmission mode.

Further, the first ion guide is an I-type square quadrupole for collisional focusing and transmission of ions in second-stage vacuum.

Further, the first ion guide is formed by assembling four plate electrodes placed in parallel, wherein the electrodes are 28 mm long, the opposite electrodes are connected together, the electrodes are driven by radio frequency voltages, and the radio frequency voltages of the adjacent electrodes are opposite in polarity.

Further, the second ion guide is an II-type square quadrupole for collisional focusing and transmission of ions in third-stage vacuum.

Further, the second ion guide is formed by assembling four plate electrodes placed in parallel, wherein the electrodes are 86 mm long and, the opposite electrodes are connected together, the electrodes are driven by radio frequency voltages, and the radio frequency voltages of the adjacent electrodes are opposite in polarity.

Further, the ion storage system further includes a gas port, a molecular pump, a mechanical pump, a front end cap, and a rear end cap.

According to a second aspect of the present disclosure, a novel ion storage method based on a quadrupole-ion trap tandem mass spectrometry is provided. The ion storage method is operated based on the novel ion storage system based on the quadrupole-ion trap tandem mass spectrometry in any of the preceding aspects, and comprises nine time sequences: Init (initialization), pre-ion (pre-ionization), ionization, cooling, cooling1, pre-sample (pre-sampling), sample (sampling), down (decreasing), and zero (zeroing).

In the time sequences of Init, pre-ion and ionization, the voltages of the second lens and the third lens are maintained at +10 V and +200 V, respectively, and the first ion guide and the second ion guide operate in the ion storage mode; and in the time sequences of cooling, cooling1, pre-sample, sample, down and zero, the voltage of the second lens is decreased from +10 V to −20 V, the voltage of the third lens is decreased from +200 V to −5.6 V, and the first ion guide and the second ion guide operate in the ion transmission mode.

Further, the radio frequency voltage of a quadrupole and the radio frequency voltage of an ion trap are increased from 0 V to a certain constant value in the time sequence of ionization: the skimmer, as a switching lens through which ions enter the next stage, is set to +14 V and is in an open state in the time sequence of ionization; and the voltage of the first ion guide is maintained at −2.5 V, the voltage of the first lens is maintained at −6 V, and the voltage of the second ion guide is maintained at −6.1 V throughout a mass cycle.

The present disclosure has the following beneficial effects: an ion guide storage function is achieved by improving time sequence control of the instrument. When the ion trap is in an ion analysis state (at the moment, the ion trap cannot perform storage), the ion guides continuously perform ion storage, which improves the duty cycle of ion storage. Compared with conventional time sequence control methods, the system and the method have the advantages that more ions are stored with in the same period of time, and the sensitivity of the instrument is improved.

BRIEF DESCRIPTION OF THE DRAWINGS

To more clearly describe technical solutions in the embodiments of the present disclosure or in the prior art, the drawings used in description of the embodiments or the prior art will be introduced briefly below. Obviously, the drawings described below are only some embodiments of the present disclosure, and those of ordinary skill in the art may also obtain other drawings based on structures shown in these drawings without creative effort.

DETAILED DESCRIPTION OF THE EMBODIMENTS

Figure 1:
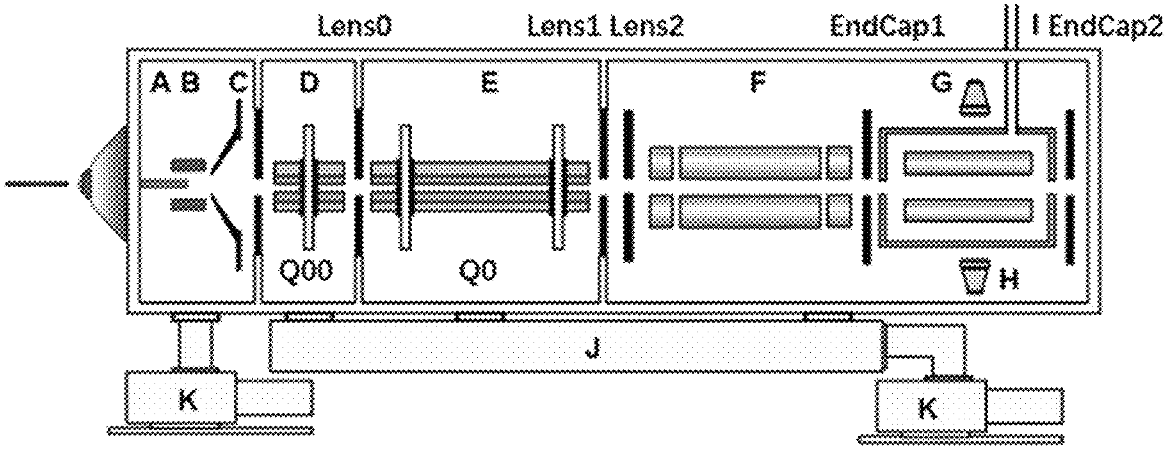
FIG. 1 shows a structure diagram of a novel ion storage system based on a quadrupole-ion trap tandem mass spectrometry according to an embodiment of the present disclosure.

Exemplary embodiments will be described in detail here, examples of which are represented in the drawings. When drawings are involved in the following description, same numerals in different drawings represent same or similar elements, unless otherwise indicated. The implementations described in the following exemplary embodiments do not represent all implementations consistent with the present disclosure. On the contrary, they are merely examples of apparatuses and methods consistent with some aspects of the present disclosure as detailed in the appended claims.

The terms "first", "second" and the like in the description and claims of the present disclosure are used for distinguishing similar objects, and do not need to be used for describing a specific order or sequence. It should be appreciated that data so used are interchangeable under appropriate circumstances so that the embodiments of the present disclosure described herein can be implemented, for example, in an order other than those illustrated or described herein.

In addition, the terms "include" and "have" and any variations thereof are intended to cover non-exclusive inclusion, e.g., a process, method, system, product or device that includes a series of steps or units does not need to be limited to the steps or units that are clearly listed, but may include other steps or units that are not clearly listed or are inherent to the process, method, product or device.

Multiple includes two or more.

It should be appreciated that the term "and/or" used in the present disclosure merely represents an association relationship describing associated objects, indicating there may be three relationships. For example, A and/or B may indicate three situations: A exists alone: both A and B exist; and B exists alone.

A novel ion storage system based on a quadrupole-ion trap tandem mass spectrometry according to an embodiment of the present disclosure, as shown in FIG. 1, includes: A. a heating capillary, B. a tube lens, C. a skimmer, D. an ion guide Q00, E. an ion guide Q0, F. a quadrupole mass analyzer, G. an ion trap mass analyzer, H. a detector, I. a gas port: J. a molecular pump; and K. a mechanical pump. Lens0, Lens1 and Lens2 are lenses 0, 1 and 2. EndCap1 is a front end cap and EndCap2 is a rear end cap.

A conventional ion transmission mode and a mass spectrometry control scheme of the present disclosure are compared below.

Conventional ion transmission mode: an ion source ionizes a sample to form ions, which are transmitted to the ion guide Q00 and the ion guide Q0 through the tube lens and the skimmer, wherein the ion guide Q00 and the ion guide Q0 function to implement collisional focusing and transmission at the moment: the ions are focused and transmitted by the lens 1 and the lens 2 to the quadrupole mass analyzer and the ion trap mass analyzer; and finally, the detector detects the ions.

Figure 2:
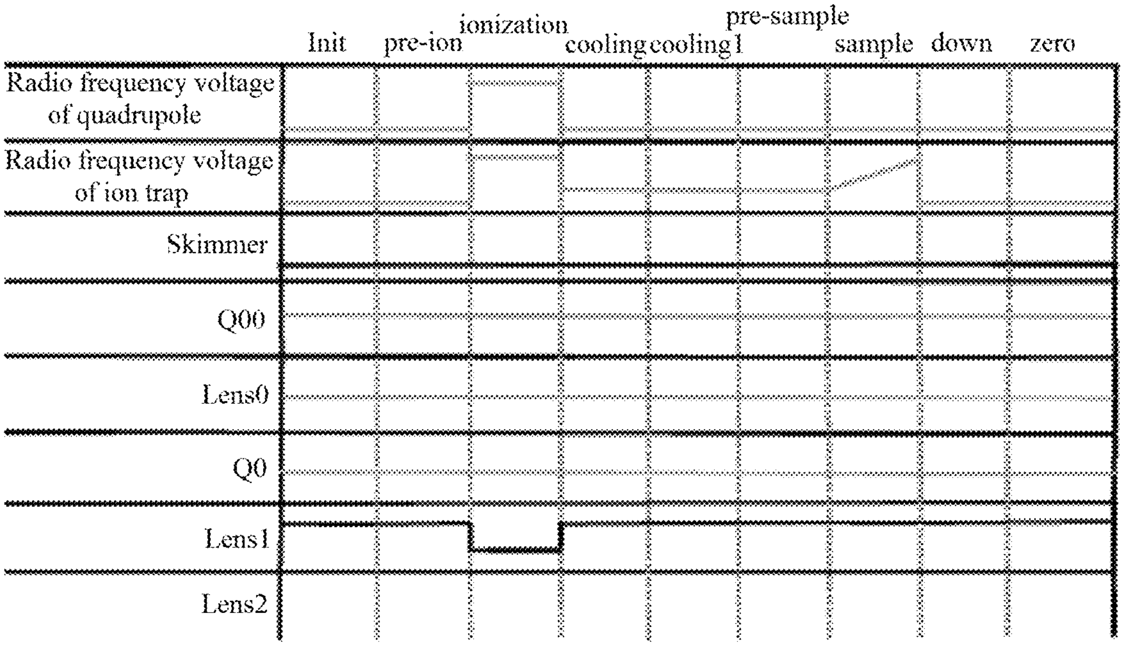
FIG. 2 shows a time sequence diagram of a conventional ion transmission mode.

In the conventional ion transmission mode, only the ion trap mass analyzer can store ions, and the ion trap is unable to store ions while analyzing ions in the trap, which results in a very low duty cycle (the percentage of time the analyte ions are sampled in total cycle time). A time sequence diagram is as shown in FIG. 2: the radio frequency voltage of a quadrupole and the radio frequency voltage of an ion trap are increased from 0 V to a certain constant value during ion trapping in ionization, and then are decreased in the next time sequence. The voltage Lens2 is at −5.7 V during ion trapping in ionization, and is at +200 V in the other time sequences. The skimmer, as a switching lens through which ions enter the next stage, is open (at +14 V) during ion trapping in ionization and is closed after the ions enter the next stage. After the skimmer is closed (at −150 V), the ion trap only operates inside the trap and cannot store ions. Throughout the cycle, the voltage of the ion guide Q00 is always at −3V, the voltage of Lens0 is always at −4.8 V, the voltage of the ion guide Q0 is always at −4.4 V, and the voltage of Lens1 is always at −6 V.

Mass spectrometry control solution of the present disclosure: before ions are introduced into the mass analyzers (the quadrupole and the ion trap), the ion guides are operated to store ions produced by electrospray.

Figure 3A:
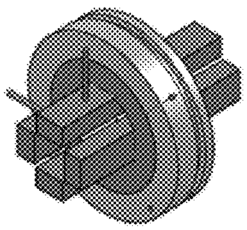
FIG. 3(*a*) and FIG. 3(*b*) show structure diagrams of ion guides Q00 and Q0.
Figure 3B:
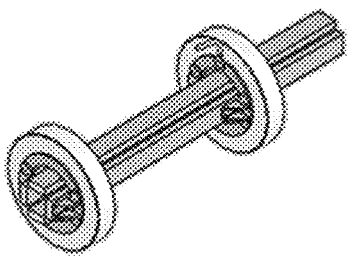

Ion guide Q00 (an I-type square quadrupole, as shown in FIG. 3(*a*)) is used for collisional focusing and transmission of ions in second-stage vacuum. The ion guide Q00 is formed by assembling four plate electrodes placed in parallel, wherein the electrodes are 28 mm long, the opposite electrodes are connected together, the electrodes are driven by radio frequency voltages, and the radio frequency voltages of the adjacent electrodes are opposite in polarity.

Ion guide Q0 (an II-type square quadrupole, as shown in FIG. 3(*b*)) is used for collisional focusing and transmission of ions in third-stage vacuum. The ion guide Q0 is also formed by assembling four plate electrodes placed in parallel, wherein the electrodes are 86 mm long, the opposite electrodes are connected together, the electrodes are driven by radio frequency voltages, and the radio frequency voltages of adjacent electrodes are opposite in polarity.

According to the mass spectrometry control solution in embodiments of the present disclosure, Lens1 is used as a switch when the ion guides store ions: when Lens1 is set to +10 V, the ion guides store ions, and when Lens1 is set to −20 V, the ion guides operate in the conventional ion transmission mode.

Figure 4:
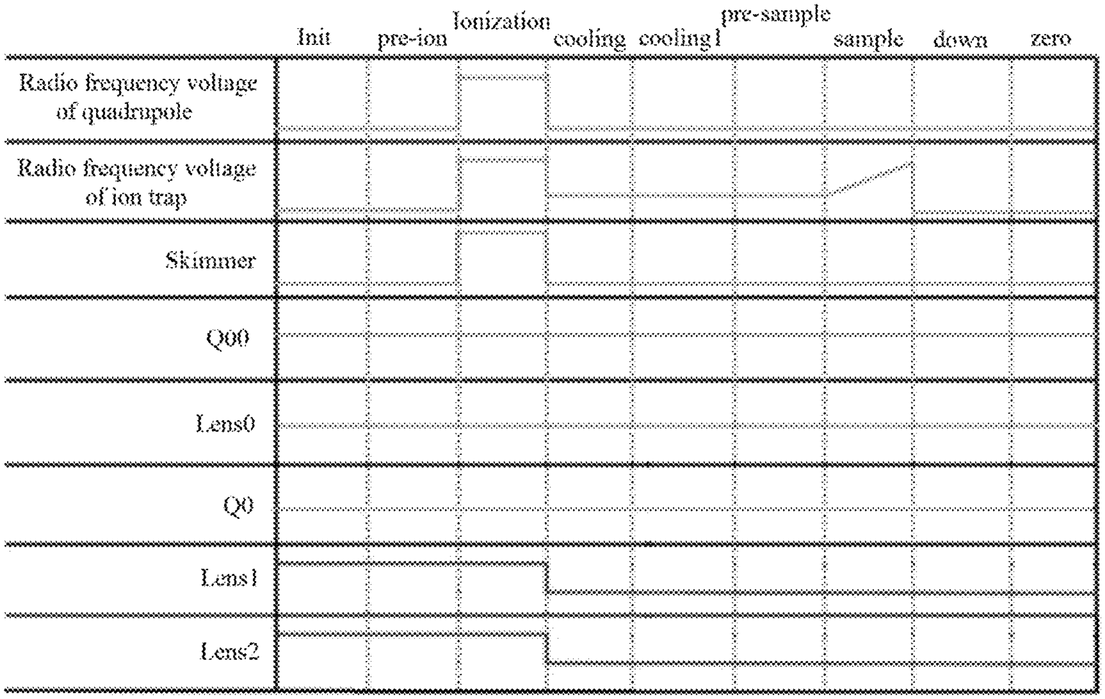
FIG. 4 shows a time sequence diagram of a novel ion storage method based on a quadrupole-ion trap tandem mass spectrometry according to an embodiment of the present disclosure.

A time sequence of the mass spectrometry control solution according to embodiments of the present disclosure is as shown in FIG. 4.

The radio frequency voltage of the quadrupole and the radio frequency voltage of the ion trap are increased from 0 V to a certain constant value in the ionization stage: the skimmer, as a switching lens through which ions enter the next stage, is set to +14 V and is in an open state in this time sequence: the voltages of Lens1 and Lens2 are always maintained at +10 V and +200 V in the first three time sequences of Init, pre-ion, and ionization, preventing the ions produced by electrospray from entering the mass analyzer and allowing the ions to be stored in the ion guide Q0; and throughout the mass cycle, the voltage of the ion guide Q00 is always at −2.5 V, the voltage of Lens0 is always at −6 V, and the voltage of the ion guide Q0 is always at −6.1 V.

In the last six time sequences (cooling, cooling1, pre-sample, sample, down, and zero), the voltage of Lens1 is decreased from +10 V to −20 V, and the voltage of Lens2 is decreased from +200 V to −5.6 V, such that the ions are introduced from the ion guide Q0 to the quadrupole and finally enter the ion trap.

Embodiment 1

Ion Guide Storage

Figure 5:
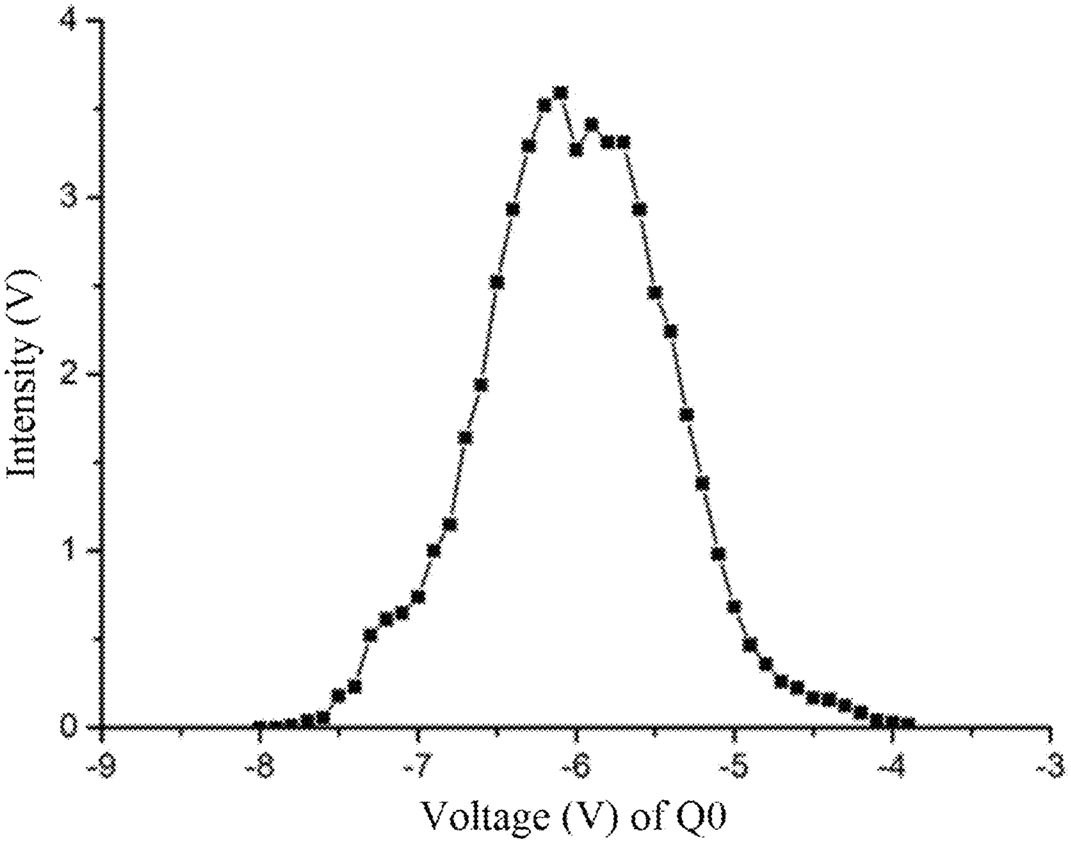
FIG. 5 shows a diagram of a voltage variation trend of an ion guide Q0 according to an embodiment of the present disclosure.

A reserpine sample is used, a scan range of a mass-to-charge ratio m/z is 550 to 650, the voltage of the ion guide Q0 in an ion guide storage mode is optimized, and a relationship between the voltage of the ion guide Q0 and signal intensity is as shown in FIG. 5. An optimal value for storage of the ion guide Q0 is −6.1 V.

Figure 6:
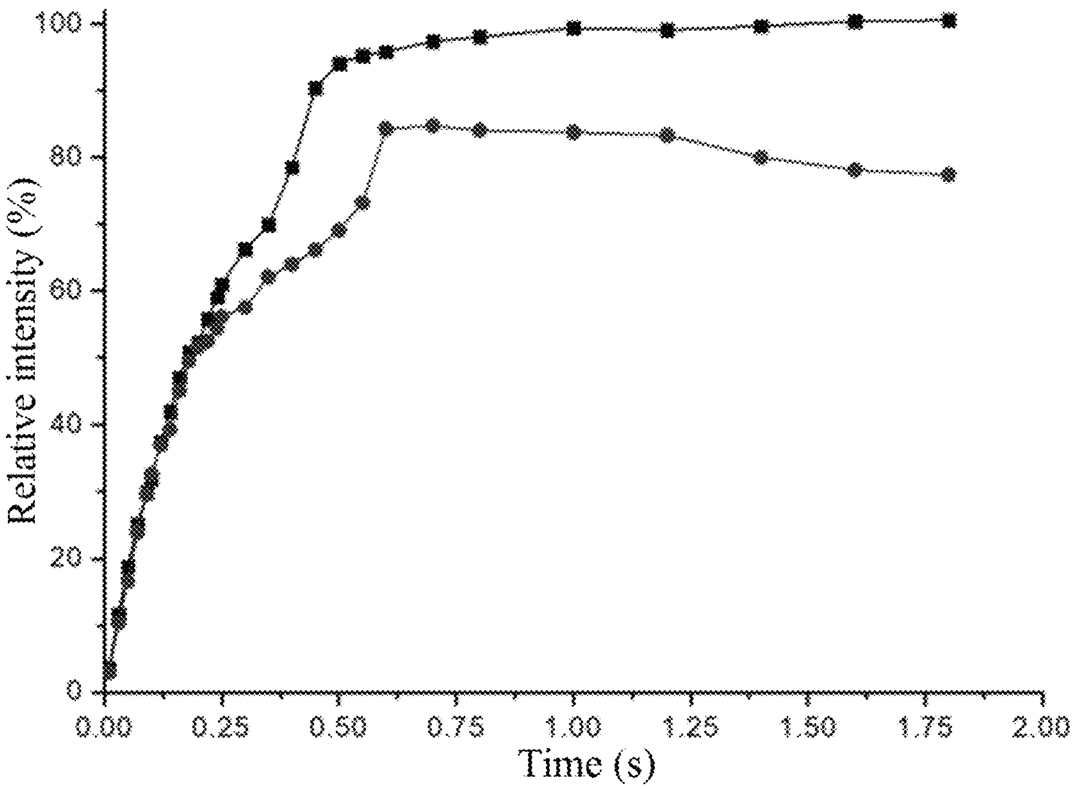
FIG. 6 shows a comparison diagram of intensity variation trends in a conventional ion transmission mode (marked by squares) and an ion guide storage mode (marked by dots)

A reserpine sample is used, a scan range of a mass-to-charge ratio m/z is 550 to 650, the conventional ion transmission mode is compared with the ion guide storage mode to obtain a relationship between storage time and signal intensity, and an experimental result is as shown in FIG. 6.

Figure 7:
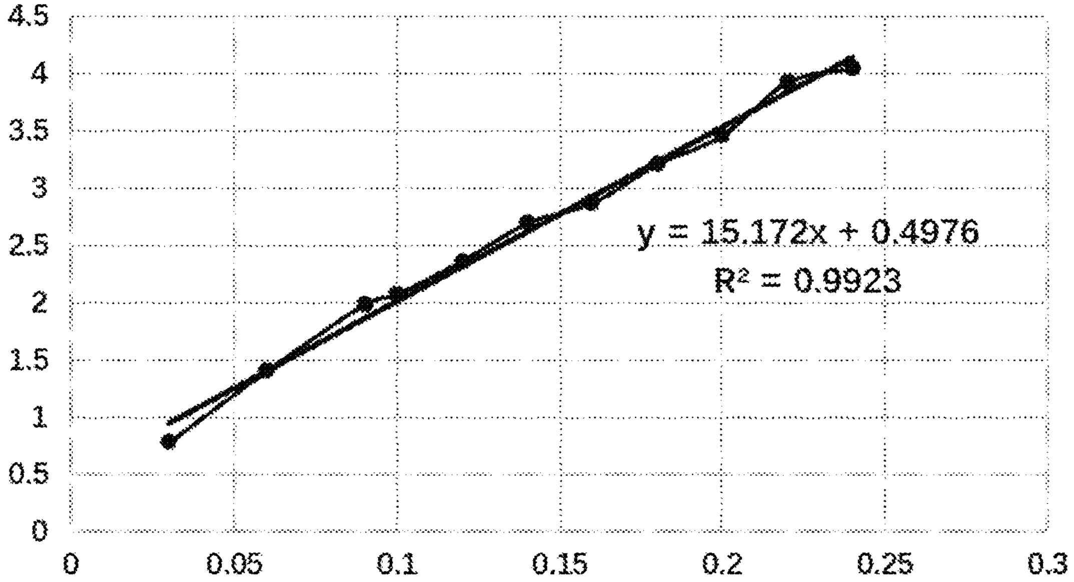
FIG. 7 shows a linear diagram of an ion guide storage mode.

It can be seen from the trends of signal intensity variations in the conventional ion transmission mode and the ion guide storage mode, as storage time increases, the signal intensities in the two modes increase first, and tend to be stable after reaching saturation. For the ion guide storage mode: during 0.03 s to 0.22 s, the intensity increases linearly as shown in FIG. 7, $R^2$=0.9923; during 0.22 s to 0.55 s, the intensity increases nonlinearly; and after 0.55 s, the intensity reaches saturation and is almost constant. As can be seen from FIG. 6, the ion guide Q0 achieves a storage function and achieves the same intensity variation trend as the conventional ion trap storage mode.

Overall, the intensity in the novel ion guide storage mode in the nonlinear range is lower than that in the conventional ion transmission mode, which is resulting from mechanical structure differences between components (the ion guide Q0 and the ion trap) themselves.

In terms of mechanical structure design, the storage capacity of the ion trap is larger than that of the ion guide Q0. According to a curve marked by dots in FIG. 6, before 0.22 s, the ion guide Q0 is always in the ion storage mode, and the storage capacity increases linearly to about 52% in the figure; and during 0.22 s-0.55 s, the storage capacity of the ion guide Q0 is saturated, and about 20% of signal enhancement originates from storage by the ion guide Q00 at the moment. Internal volumes calculated based on mechanical designs of the ion guide Q00, the ion guide Q0 and the ion trap are substantially same in proportion. After 0.6 s, the ion guide Q0 and the ion guide Q00 are fully saturated, ions start to overflow therefrom, and as the number of overflowing ions increases, the number of effectively detected particles decreases, thus the intensity decreases, and the curve marked by dots keeps a decreasing trend.

$R^2$ is calculated in the time period 0.03 s-0.22 s to obtain $R^2$=0.9923.

Figure 8:
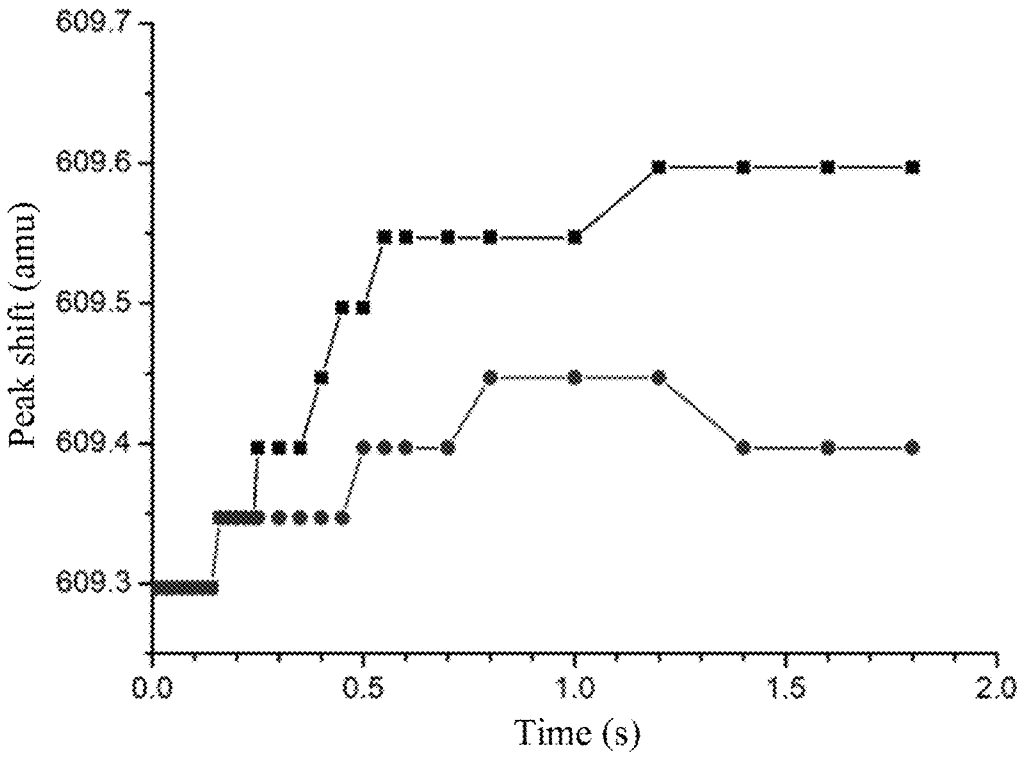
FIG. 8 shows a diagram of peak shift variation trends in a conventional ion transmission mode (marked by squares) and an ion guide storage mode (marked by dots).
Figure 9:
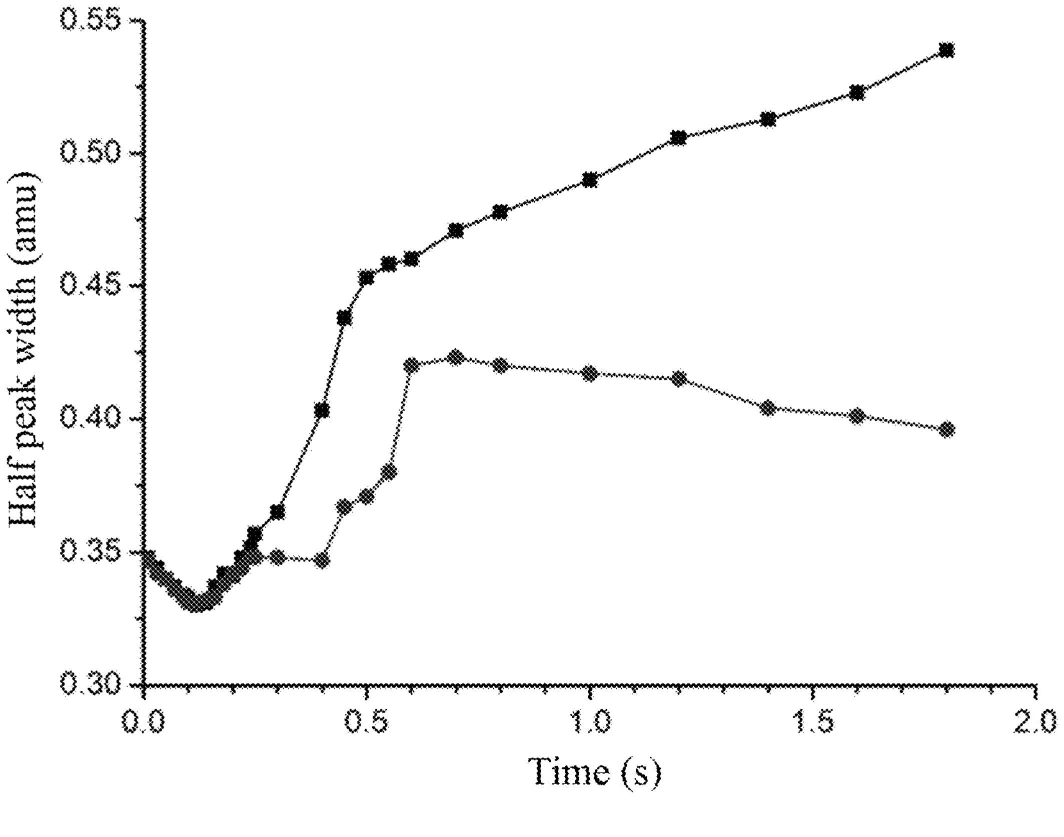
FIG. 9 shows a diagram of half peak width variation trends in a conventional ion transmission mode (marked by squares) and an ion guide storage mode (marked by dots)

Peak shifts (FIG. 8) and resolutions (FIG. 9) in the conventional ion trap storage mode and the novel ion guide Q0 storage mode are compared at different storage time. As the intensity in the conventional mode is greater than that in the novel ion guide storage mode, the peak shift and resolution in the conventional mode are larger.

Embodiment 2

Ion Guide-and-Ion Trap Co-Storage

Figure 10:
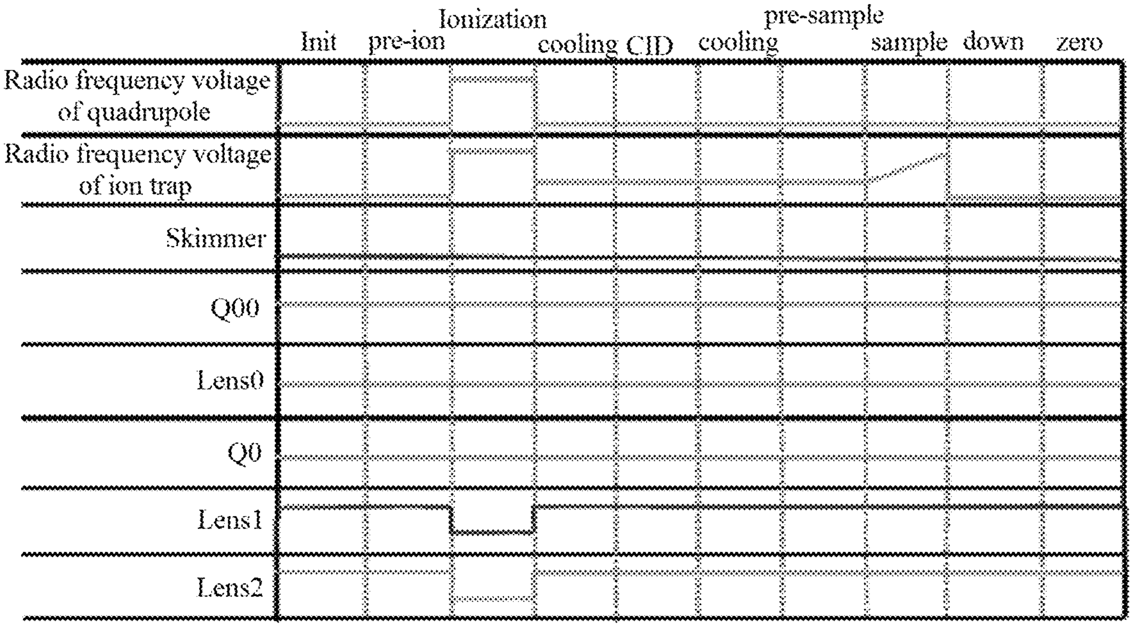
FIG. 10 shows a time sequence diagram of ion guide-and-ion trap co-storage.

A time sequence of ion guide-and-ion trap co-storage is as shown in FIG. 10: the radio frequency voltage of the quadrupole and the radio frequency voltage of the ion trap are increased from 0 V to a certain constant value in the ionization stage: the voltage of the skimmer is set to +5.5 V throughout the time sequence; and the voltage of Lens1 is decreased from +10 V to −20 V in the time sequence of ionization, and the voltage of Lens2 is decreased from +200 V to −20 V in the time sequence of ionization, to allow stored ions to enter the ion trap. Throughout the mass cycle, the voltage of the ion guide Q00 is always at −2.5 V, the voltage of Lens0 is always at −4.1 V, and the voltage of the ion guide Q0 is always at −6 V. In the last six time sequences (cooling, cooling1, pre-sample, sample, down, and zero), the voltage of Lens1 is increased from −20 V to +10 V, and the voltage of Lens2 is increased from −5.7 V to +200 V, such that the ions can be stored in the ion guides.

Figure 11:
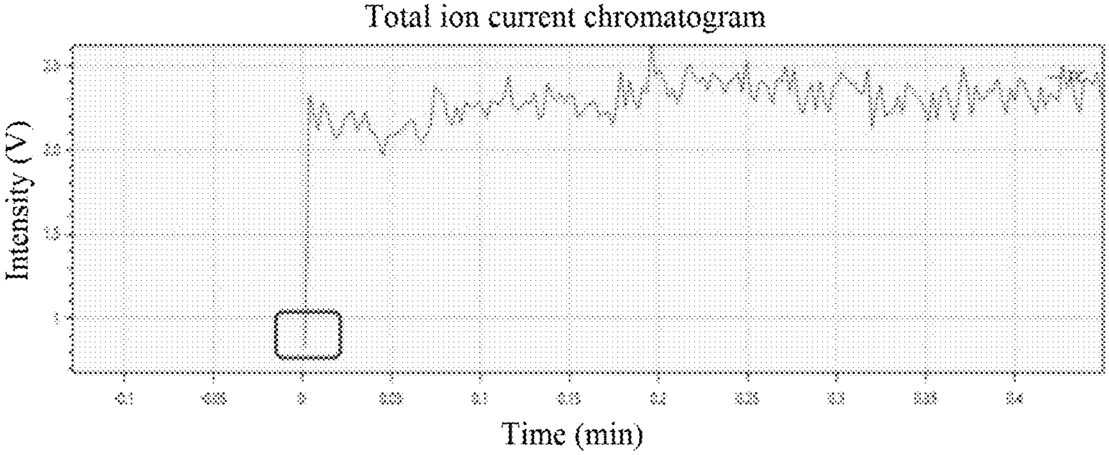
FIG. 11 shows a total ion current chromatogram of an ion guide-and-ion trap co-storage mode.

The intensity in the ion guide-and-ion trap co-storage mode is observed as shown in FIG. 11, it can be seen that a value of a first point is about 0.9 V for many times, which is close to a value at 0.05 s in direct sample introduction and is much smaller than the subsequent values, thereby being in line with our settings. The value of the first point is smaller because storage by the ion guides have not started, and the intensity at subsequent points is greater because storage by the ion guides start.

Figure 12A:
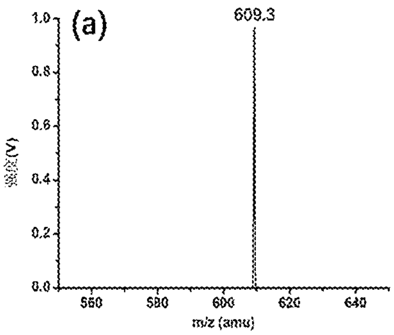
FIG. 12(*a*) shows a reserpine intensity diagram at 0.05 s in a conventional ion transmission mode, FIG. 12(*b*) shows a reserpine intensity diagram at 0.09 s in an ion guide storage mode, and FIG. 12(*c*) shows a reserpine intensity diagram of an ion guide-and-ion trap co-storage mode.
Figure 12B:
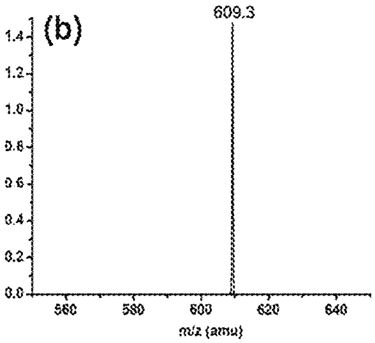
Figure 12C:
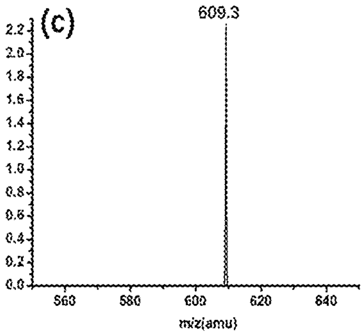

The peak intensity at 0.05 s in the conventional ion transmission mode is 0.9645 V as shown in FIG. 12(*a*), and the peak intensity at 0.09 s in the ion guide storage mode is 1.475 V as shown in FIG. 12(*b*), and the sum of the two peak intensities is 2.4395 V. Then, the ion guide-and-ion trap co-storage mode is created: storage by the ion guides is set in the stages other than the ionization stage, with total time of 0.09 s, and the time for the ionization stage (storage by the ion trap in the conventional mode) is set to 0.05 s to obtain peak intensity of 2.254V as shown in FIG. 12(*c*), which is relatively close to 2.4395 V. It is thereby demonstrated that an ion guide-and-ion trap co-storage function is achieved.

The present disclosure relates to a novel ion storage technology based on a quadrupole-ion trap tandem mass spectrometry. Unlike a conventional mass spectrometer control method, the technology uses two ion guide systems Q00 and Q0 for ion storage, in combination with the conventional ion trap storage mode to achieve a 100% duty cycle, which increases the storage capacity of the mass spectrometer, improves the sensitivity of the instrument, and reduces the detection limit of the instrument.

The embodiments of the present disclosure are described above in conjunction with the drawings, but the present disclosure is not limited to the specific implementations described above. The foregoing specific implementations are only illustrative and not restrictive. Under the enlightenment of the present disclosure, those of ordinary skill in the art can also make many forms without departing from the spirit of the present disclosure and the protection scope of the claims, and these forms all fall within the protection of the present disclosure.

What is claimed is:

1. An ion storage system based on a quadrupole-ion trap tandem mass spectrometry, comprising a heating capillary, a tube lens, a skimmer, a first ion guide, a second ion guide, a quadrupole mass analyzer, an ion trap mass analyzer, and a detector that are sequentially arranged, wherein a first lens disposed between the first ion guide and the second ion guide; and a second lens and a third lens are disposed between the second ion guide and the quadrupole mass analyzer, wherein the first ion guide is a quadrupole for collisional focusing and transmission of ions in second-stage vacuum, and wherein the second ion guide is a quadrupole for collisional focusing and transmission of ions in third-stage vacuum.

2. The ion storage system according to claim 1, wherein: when the voltage of the second lens is set to +10 V, the first ion guide and the second ion guide operate in the ion storage mode; and when the voltage of the second lens is set to −20 V, the first ion guide and the second ion guide operate in the ion transmission mode.

3. The ion storage system according to claim 1, wherein the first ion guide is formed by assembling four plate electrodes placed in parallel that are driven by radio frequency voltages, and the radio frequency voltages of adjacent electrodes among the four plate electrodes in the first ion guide are opposite in polarity.

4. The ion storage system according to claim 1, wherein the second ion guide is formed four plate electrodes placed in parallel that are driven by radio frequency voltages, and the radio frequency voltages of the adjacent electrodes among the four plate electrodes in the second ion guide are opposite in polarity.

5. The ion storage system according to claim 1, wherein the ion storage system further comprises a gas port, a molecular pump, a mechanical pump, a front end cap, and a rear end cap.

6. The ion storage system according to claim 1, wherein, when operating in an ion storage mode, the third lens is at a voltage of +200 V, and when operating in an ion transmission mode, the third lens is at a voltage of 5.6 V.

* * * * *